United States Patent [19]

Gratzmuller

[11] 4,078,121
[45] Mar. 7, 1978

[54] SAFETY-VALVE STOPPER ESPECIALLY INTENDED FOR ELECTRIC STORAGE BATTERIES

[76] Inventor: Claude Alain Gratzmuller, 30 Av.Georges Mandel, 75116 Paris, France

[21] Appl. No.: 697,789

[22] Filed: Jun. 21, 1976

[30] Foreign Application Priority Data

Jun. 26, 1975  France .................. 75 20025

[51] Int. Cl.² .................................. H01M 2/12
[52] U.S. Cl. ........................................ 429/54
[58] Field of Search ............................ 429/54

[56] References Cited

U.S. PATENT DOCUMENTS

| | | | |
|---|---|---|---|
| 2,558,654 | 6/1951 | Kendall et al. | 429/54 |
| 2,571,893 | 10/1951 | Kendall | 429/54 |
| 2,790,570 | 4/1957 | Hodges et al. | 429/54 |
| 3,436,273 | 4/1969 | Gratzmuller | 429/54 |

*Primary Examiner*—Donald L. Walton
*Attorney, Agent, or Firm*—Cantor and Singer

[57] ABSTRACT

The invention relates to a stopper with valve for a storage battery which permits the gases evolved by the storage battery to escape only above a precise specific pressure higher than the atmospheric pressure.

The valve includes a diaphragm clack maintained gripped in a fluid-tight manner at its periphery, between the body of the stopper and a hood which covers a calibrated spring normally keeping the valve closed. The hood is secured on the body solely by ratchet engagement of these two members which have corresponding frustoconical surfaces and of which at least one is deformable.

The stopper with valve is for application to fixed or starting storage batteries in order to lessen the consumption of water in the batteries.

5 Claims, 7 Drawing Figures

SAFETY-VALVE STOPPER ESPECIALLY INTENDED FOR ELECTRIC STORAGE BATTERIES

The subject of the present invention is a safetyvalve stopper especially intended for electric storage batteries.

It is known that electric storage batteries, at the end of charging and in the event of overcharging, emit gases, generally a mixture of hydrogen and oxygen arising from the decomposition of the water, and that these gases must be able to escape into the atmosphere. Besides, it is advantageous to provide for storage batteries which can be inclined or turned upside down, momentarily, or even for long periods, for example during transport thereof, without their electrolyte being able to escape therefrom.

One solution to this problem consists in permitting communication of the interior of the storage battery box with the atmosphere only when the internal pressure of the storage battery is greater than the atmospheric pressure by a predetermined amount, by means of a safety valve replacing the standard plugging stopper.

A supplementary advantage of such a solution resides in the fact that the losses of liquid from the storage battery in normal service are considerably reduced because of this putting under pressure, which enables separation of the operations of checking the levels of electrolyte and of restoration of these levels. In the case of automobile storage batteries, which are often located below the engine hood and hence subjected to considerable variations of temperature, it is very desirable, just as for many other automobile accessories, that the maintenance operations be as infrequent as possible.

One of the main difficulties of the problem consists in bringing about a valve of very reduced bulk given that the plug stopper is generally included between the two positive and negative terminals of the storage battery and that the space available in the height direction is small. A second difficulty resides in that the valve must open with certainty on account of an internal pressure val of the storage battery greater than a predetermined maximum pressure and be shut up again, with complete fluid-tightness, on account of a pressure value lower than a predetermined minimum value. Indeed, regard must be had for these maximum and minimum values of the pressure in order to take into account the low mechanical resistance of storage battery boxes, the desire not to complicate the problem of the fluid-tight passage of the terminals through the wall of the storage battery box, as well as the variations of the internal temperature of the storage battery and of the atmospheric pressure. The valve must open at a maximum pressure "P", for example 500 millibars above the atmospheric pressure and be shut up again in a fluid-tight manner at a minimum pressure $p = 0.8P$, for example 400 millibars above the atmospheric pressure, whatever may be the time and place considered.

A third difficulty resides in the fact that the valve must be capable of working correctly in a very wide range of temperatures, for example of the order of $-40°$ C to $+ 70°$ C.

A valve of such precision, with guaranteed fluid-tight closure, can only be realized in practice if its moving part is constituted by a movable partition balanced by a spring and the active surface area of which is at least ten times greater than the surface area of the fluid-tight clack. Indeed, the valve is called upon to remain closed during long periods of time, so that there is a strong chance of the clack sticking on its seat and the movable partition must therefore be capable of exerting a force sufficient to unstick same before the maximum opening pressure is reached.

Finally, the lowering of the cost price is always sought after, and this further increases the difficulties.

Valves which already fulfil some required working conditions are those described and shown in the French Pat. No. 989,774 filed on Apr. 28, 1949, for "Improvements in safety valves", and French Pat. No. 1,400,483 of Apr. 14, 1964, for "Discharge valve".

Such valves comprise a body which is provided with a threaded ferrule and which has a chamber with an annular seat the interior of which is connected with ducts in communication with the atmosphere, and the exterior of which is connected with ducts which open into the end of said ferrule in order to be in communication with the interior of the enclosure on to which the valve body is to be screwed, while a clack, integral with a flexible diaphragm the active surface of which is much greater than that of said clack and which is held, in the body, by its periphery, is urged against said seat, under the action of a return spring, by a diaphragm guide slidably mounted in a hood fixed on the body.

These valves however, have a relatively high number of parts which must be machined with precision and the assembling of which as well as the regulation require an appreciable labor time, which would make them much too expensive for application to storage battery stoppers.

Another valve of this kind, especially intended for electric storage batteries, has also been described in French Pat. No. 1,451,530 filed on July 22, 1965. This valve comprises only a small number of component parts, all of moulded plastics material, but these parts had to be put together by screwing, which made the assembling relatively long and delicate because of the risk of "twisting" the diaphragm clack during mounting thereof.

The present invention removes these various disadvantages and enables the realization of a stopper-valve, especially for a storage battery, the assembling of which is very rapid, thus very economical, without reduction of the qualities in precision, at the opening and the closing of the valve, although there is no regulation when the constituent members are assembled.

According to the present invention I provide a stopper with a valve for an electric storage battery intended to put the internal volume of a storage battery into communication with the atmosphere solely beyond a specific pressure greater than the atmospheric pressure, comprising a body including a portion fitting in a fluid-tight but removable manner upon the storage battery opening and including a clack valve seat communicating with the atmosphere but normally obturated by the central area of a clack-valve diaphragm having a surface area at least ten times greater than that of the seat, said diaphragm being acted upon in the direction of obturation of the seat by the atmospheric pressure prevailing on one of its surfaces and by elastic means calibrated as a function of the aforesaid specific pressure and being acted upon in the direction of opening of the seat by the pressure prevailing in the storage battery and which acts on the opposite surface of said diaphragm, said stopper also comprising a hood constituting the fixed point of support of said elastic means, said hood and said body including cooperating snap action holding means so designed that the peripheral edge of said diaphragm is clamped in a fluid-tight manner between the hood and the body when they are put together.

In accordance with an essential feature of the invention the body member is formed with an upper expandable portion and the hood member with an outer annular ridge portion engageable into the body member through said expandable portion thereof, said ridge portion and said expandable portion being so designed and so interrelated with one another that said expandable portion produces, upon engagement of the hood member into the body member, a combined snap and urge action capable of resiliently holding the two members together while keeping the peripheral edge of the diaphragm tight between them.

Thanks to said snap action holding means there is obtained an assembly which is simple, efficient and inexpensive in construction giving in practice satisfactory and reliable results, and which eliminates the need for testing in manufacture.

The invention will be better understood on reading the detailed description which follows and on examining the accompanying drawings given with a non-limiting intent and which show several embodiments of the invention.

Figure 1:
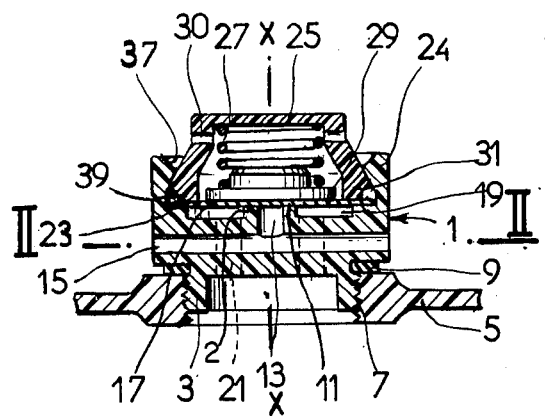
FIG. 1 is a sectional view on an axial plane through the valve.
Figure 2:
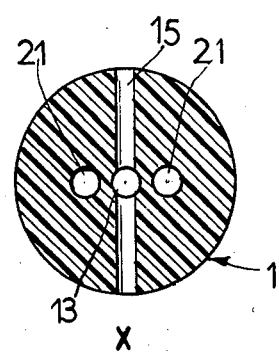
FIG. 2 is a sectional view along the line II—II of FIG. 1.

The stopper comprises a body 1 the lower portion 3 of which can be fitted in a fluid-tight manner on the opening provided in the cover 5 of a cell of a storage battery. The portion 3 may, for example, have a screw-thread 7 which is screwed into the tapped opening in the cover 5, but it could just as well have the form of a double-coned sleeve which fits tight into the opening in the cover. An elastic gasket 9 ensures the fluid-tightness.

In its intermediate portion, the body 1 includes a boss 2 having a valve seat 11, centered on the axis of rotation XX of the body, this seat communicating with the atmosphere through an axial duct 13 which opens into a radial duct 15 cut preferably over the full diameter of the body. The duct 13 opens to the atmosphere above the gasket 9.

The seat 11 is normally obturated by the central area of a clack valve diaphragm 17, the area of this diaphragm being very large (for example 10 to 50 times larger) in relation to the working section of the seat 11.

The diaphragm 17 tends to be raised above the seat 11 by the pressure prevailing in the interior of the storage battery, this pressure reaching an annular chamber 19 which is made intermediate portion of the body 1 and which communicates with the interior of the storage battery through a duct 21 or a plurality of ducts 21 cut in one or more planes spaced from the axial plane containing the duct 13.

The stopper also comprises a hood 25 of which one part, for example the base, serves as fixed support point for elastic means such as a helical spring 27 the other end of which tends to urge the diaphragm 17 on to its seat through the intermediary of a support member or diaphragm plate 29. The hood 25 is provided with a breathing hole 30 or a plurality of breathing holes 30, with the result that the diaphragm 17 tends to be applied on to its seat not only by the action of the spring 27 but also by the atmospheric pressure.

The free peripheral margin 31 of the hood 25 has a shape such that it can co-operate with an expandable ring 24 of the body 1 in order to hold the hood member and the body member together at 23 while maintaining closely pressed between these two members the peripheral edge of the diaphragm 17.

Figure 3:
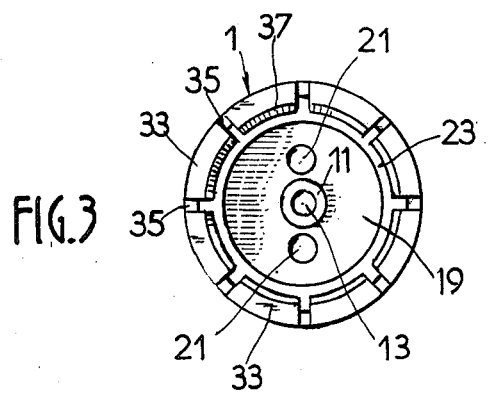
FIG. 3 is a plan view of the valve body.
Figure 4:
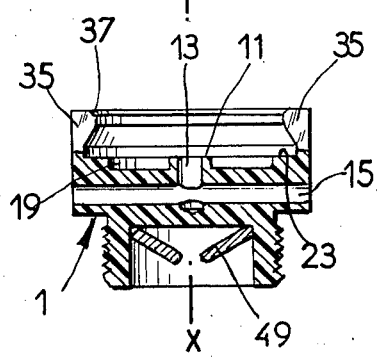
FIG. 4 is a sectional view on an axial plane through the valve body.

The ring 24 is constituted by a circular row of resilient teeth 33 (FIG. 3) separated by notches 35, the internal profile of the teeth 33 being in the form of a truncated cone as can be seen in FIG. 4. In a corresponding manner, the external profile of the hood 25, at least in its part called upon to co-operate with the ring 24, is also in the form of a truncated cone.

The body 1 is produced from moulded plastics material, for example PVC of sufficient flexibility in order that the teeth 33 of the ring can be elastically deformed or expanded on introducing the hood between the teeth, and bevelled edges 37 and 39 of the shape of truncated cones are provided in order to facilitate the introduction of the two members one into the other.

It will, thus, be apparent that when assembling the vent plug of the present invention, the diaphragm 17 is placed upon valve seat 11 with its outer peripheral edge portion seated upon portion 23 of body 1. Hood 25 is inserted in body 1 with spring 27 interposed therebetween by pushing bevelled edge 39 of hood 25 against bevelled edge 37 of ring portion 24 of body 1. Since ring 24 is elastically deformable, or expandable, it is pushed outwardly to allow entrance of peripheral margin 31 of hood 25 into the space between ring 24 and the main portion of body 1 whereupon ring 24 due to its resiliency springs back and forms a mateing fit with peripheral margin 31 of hood 25 since they are both of a truncated cone shape.

It will therefore be seen that the valve in accordance with the invention includes only a small number of very cheap moulded members (the diaphragm may in a modification be cut out in a plate) which are assembled quickly in a single operation.

It is sufficient to determine the characteristics of the spring in order to obtain the desired opening pressures. This being the case, one and the same stopper may be fitted with one or other of three springs, selected for example for pressures of 0.2, 0.5 and 1 bar, the pre-compression of the spring, on mounting thereof, being always identical in itself and not requiring any regulation.

Likewise, the diaphragm is always gripped in the same way and there is no chance of its undergoing a spinning action on being mounted, since the assembling is effected in the axial direction.

Moreover, a stopper of very small dimensions may be realized, and especially of a prominance which does not exceed that of standard storage battery stoppers, without a valve.

Figure 5:
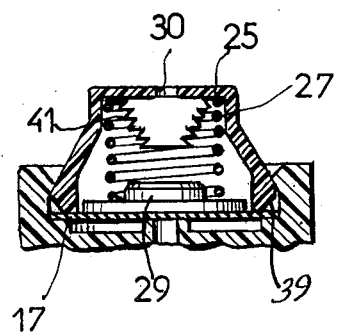
FIGS. 5 and 6 are sectional views of parts of two modified valves.

In particular, because of the large variations in temperature and atmospheric pressure to which storage batteries are subject, it is important that the hood be pierced by at least one small breathing opening 30. If the spring is metallic precautions may be taken to protect same against acid vapours which could get into the hood when the stoppers are used on storage batteries of lead. In such a case the spring may be coated with grease when mounted or else a bellows or "glove finger" 41 of very flexible elastomeric material may be arranged in the base of the hood 25, as is indicated in FIG. 5, the bellows 41 covering the breathing opening 30. The internal volume of the hood 25 which contains the spring 27 is thus protected from any communication with the exterior which remaining permanently at atmospheric pressure, thanks to the deformability of the bellows 41. It will be seen, moreover, that fixation of the bellows in place may be simply provided in a fluid-tight manner by the uppermost turn of the spring 27.

Figure 6:
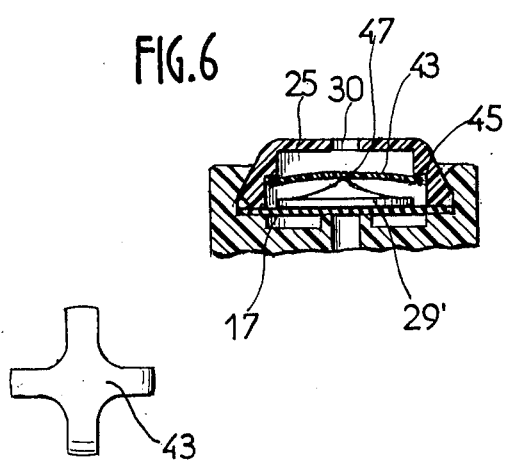
Figure 7:
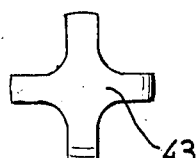
FIG. 7 is a plan view of the valve spring in the modification of FIG. 6.

In accordance with another modification shown in FIGS. 6 and 7, the helical spring may be replaced by a plate spring 43 of moulded or stamped plastics material and having the shape of a cross. The ends of the arms of the plate may rest against a projection 45 provided in the interior of the hood 25 while the central portion of the plate rests against the top of the plate 29' of the diaphragm 17.

It is, of course, necessary to select a plastics material of a quality conserving its elastic properties in spite of variations in temperature, but, in accordance with this modification, the prominence of the stopper may be further reduced and there are no precautions to be taken against corrosion by acid vapours.

A reduced prominence of the stopper may of course, also be obtained with a metallic plate spring.

Just as is usual in storage battery stoppers, baffle plates or deflectors such as 49 (FIG. 4) may be provided in order to avoid that the droplets of electrolyte, thrown out by the bubbling up of the storage battery under load, reach directly the ducts 21 which put the chamber 19 of the valve into communication with the internal volume of the storage battery.

In a valve in accordance with the invention, the large surface area of the diaphragm in relation to the working section of the seat gets a full operational response and the simple method of mounting procures a satisfactory constancy of the characteristics without precautions or testing of the mounting.

It may be mentioned, by way of example, that there have been tested a number of stopper valves of which the external dimensions were: diameter 20mm; height above the cover of the storage battery 12mm. with a diaphragm having an active surface area of 155mm$^2$ for a working section of the seat of about 3.5mm$^2$. The spring was calibrated for an opening pressure of 1200 millibars. For a series of ten stoppers, the opening pressures were between 1175 and 1300 millibars while the closing pressures were between 1050 and 1150 millibars.

Of course, the stopper valves in accordance with the invention, if they are especially made suitable for application to electric storage batteries, may also be used for other applications, for example the limitation of the pressure in large-volume containers

I claim:

1. A storage battery vent plug for closing a filler opening in a battery cell cover, comprising in combination a body member and an apertured hood member associated therewith, said body member having a normally horizontal wall, a first annular flange extending downwardly from said wall and adapted for attachment to said battery cell cover, a second annular flange extending upwardly from said wall and provided with an inner annular clamping surface, said second annular flange terminating in a circular row of resilient teeth each having a cone-shaped inner surface portion longitudinally spaced from said annular clamping surface, said hood member having a circular top wall and a flange depending therefrom, said depending flange providing an annular clamping end surface in opposition to said clamping surface of the body member, a central boss formed on the upper face of said first wall, an outlet port disposed centrally of said boss, an annular valve seating surface on said boss about said outlet port, a flexible diaphragm constituting a valve member and having its periphery clamped between the said clamping surfaces of the body member and the hood member, said diaphragm being normally in seating contact with said valve seating surface so as to define with said first wall and said second flange an annular pressure chamber about said boss, an inlet duct formed in said first wall for establishing a communication between said pressure chamber and the interior of said first flange, an exhaust duct formed in said first wall for establishing a communication between said outlet port and the atmosphere, a circular backing plate structure for said diaphragm resting against the upper face thereof, a calibrated spring disposed between said plate structure and said hood member for yieldingly holding the diaphragm against said seating surface but to allow the diaphragm to flex so as to permit gas flow through said outlet port only while the incoming gas from within the battery is at a pressure above a predetermined amount, and an annular ridge formed by two lower cone-shaped outer surface portions of said depending flange of the hood member, said ridge being adapted to axially engage said row of resilient teeth and radially flex said resilient teeth of the second flange so as to be received within the annular space left between the diaphragm and said row of resilient teeth, whereupon the cone-shaped inner surface portion of each of the radially deformed teeth is effective to exert on the inclined upper surface portion of said ridge a pressure tending to urge said hood member towards and maintain it in the proper diaphragm clamping position with a component force due to the resiliency of said teeth.

2. A vent plug as set forth in claim 1, in which said hood member contains a deformable enclosure in the form of a glove finger the internal volume of which is in communication with the atmosphere.

3. A vent plug as set forth in claim 1 in which said calibrated spring is a plate spring.

4. A vent plug as set forth in claim 3, in which said plate spring is cruciform in shape.

5. A vent plug as set forth in claim 4, in which said plate spring is of plastics material.

* * * * *